United States Patent [19]

Lemelson

[11] E Patent Number: Re. 32,106

[45] Reissued Date of Patent: Apr. 8, 1986

[54] TOY TRACK AND VEHICLE THEREFOR

[76] Inventor: Jerome H. Lemelson, 85 Rector St., Metuchen, N.J. 08840

[21] Appl. No.: 216,920

[22] Filed: Dec. 16, 1980

Related U.S. Patent Documents

Reissue of:

[64] Patent No.: 3,451,161
Issued: Jun. 24, 1969
Appl. No.: 636,136
Filed: May 4, 1967

U.S. Applications:

[63] Continuation of Ser. No. 71,183, Aug. 31, 1979, abandoned.

[51] Int. Cl.[4] ..... A63H 33/26; A63H 19/00

[52] U.S. Cl. ..... 446/138; 238/10 A; 238/10 E; 238/10 F

[58] Field of Search ..... 46/1 K, 43, 201, 202, 46/216, 257, 258, 259, 260, 261; 238/10 A, 10 B, 10 C, 10 E, 10 F

[56] References Cited

U.S. PATENT DOCUMENTS

| | | | |
|---|---|---|---|
| 1,679,911 | 8/1928 | Moffitt | 280/10 E |
| 1,872,204 | 8/1932 | Wily | 46/43 |
| 2,068,403 | 1/1937 | Ekstrom | 46/257 |
| 2,231,089 | 2/1941 | Rorer | 46/1 K |
| 2,416,473 | 2/1947 | Fields | 46/202 |
| 2,532,521 | 12/1950 | Stair | 46/43 |
| 2,562,623 | 7/1951 | Levering | 238/10 B |
| 2,574,067 | 11/1951 | Seidman | 238/10 C |
| 2,862,333 | 12/1958 | Gardiol | 46/202 |
| 2,917,864 | 12/1959 | Payne | 46/43 |
| 3,016,845 | 1/1962 | Lemelson | 238/10 E |
| 3,189,981 | 6/1965 | Gewin et al. | 46/236 X |

FOREIGN PATENT DOCUMENTS

| | | | |
|---|---|---|---|
| 680576 | 2/1964 | Canada . | |
| 763528 | 2/1934 | France | 46/216 |
| 1373002 | 8/1964 | France | 46/261 |
| 489503 | 7/1938 | United Kingdom | 238/10 C |

OTHER PUBLICATIONS

Yardley-advertisement on p. 87 of Mar. 1946, issue of *Plastics,* A copy has been placed in class 264–177 R.

*Primary Examiner*—F. Barry Shay
*Attorney, Agent, or Firm*—Ronald R. Snider

[57] ABSTRACT

This disclosure is directed to a toy guideway or track and vehicle for riding thereover. The track is made of a plastic material of such state and configuration wherein the track is not normally self supporting. Self support means are provided to support the track in a desired manner to define a trackway of particular configuration, and the track is provided with guide means for directing a toy vehicle thereover.

14 Claims, 25 Drawing Figures

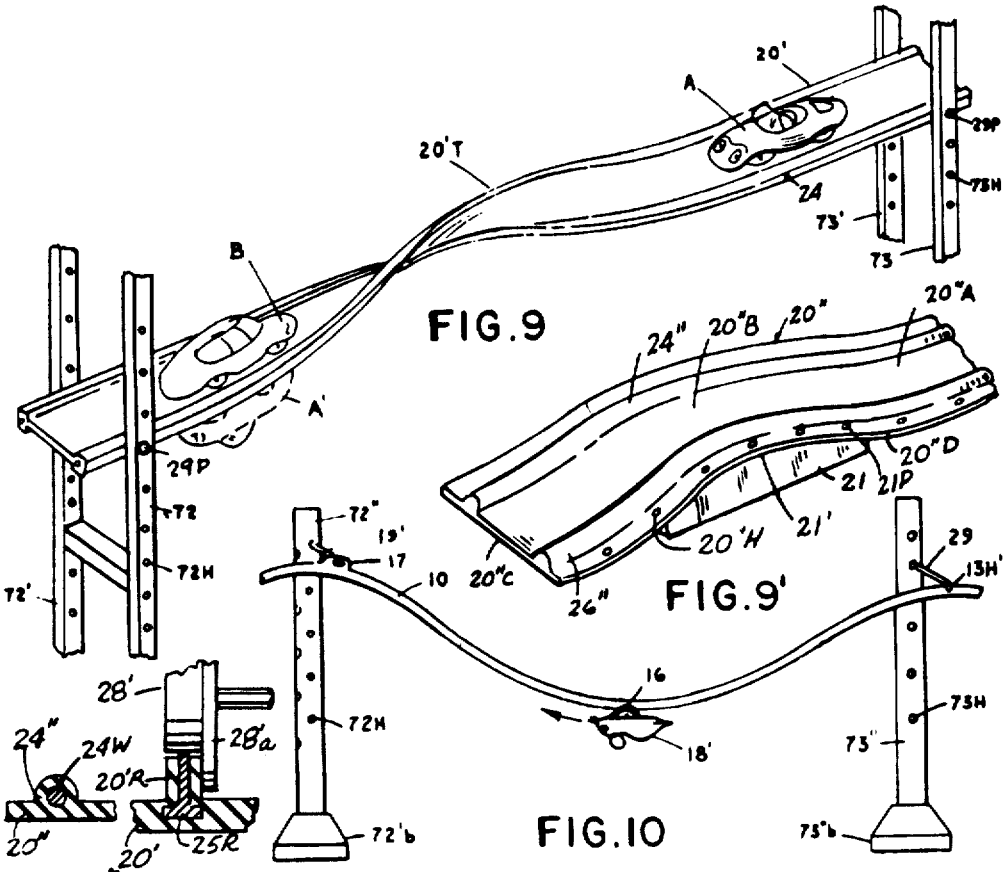
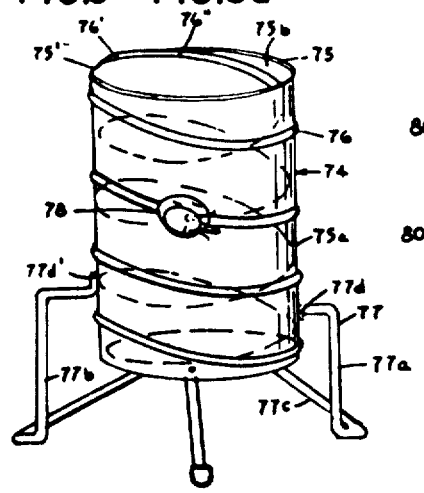
FIG.11
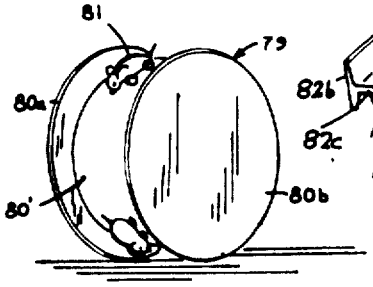
FIG.12
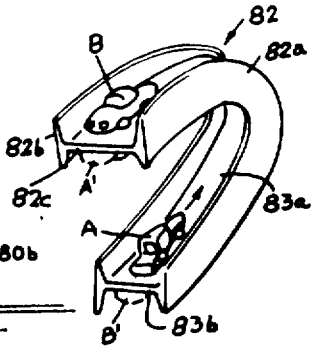
FIG.13

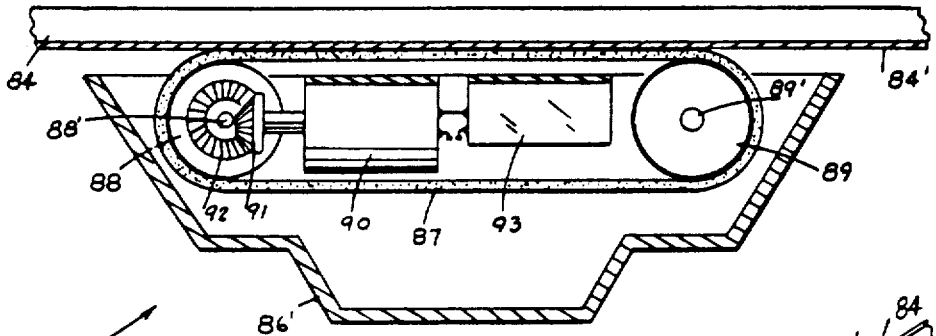
FIG. 14
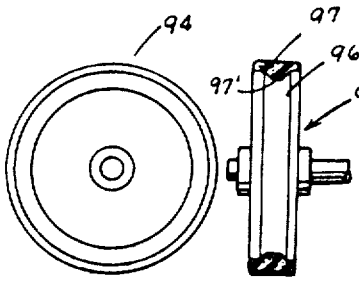
FIG. 16 FIG. 17
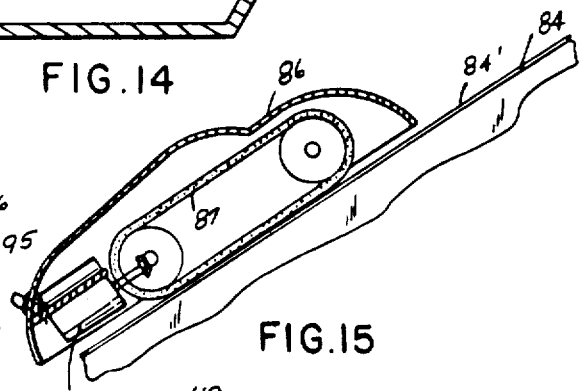
FIG. 15
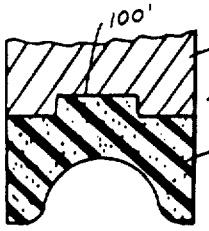
FIG. 18
FIG. 21
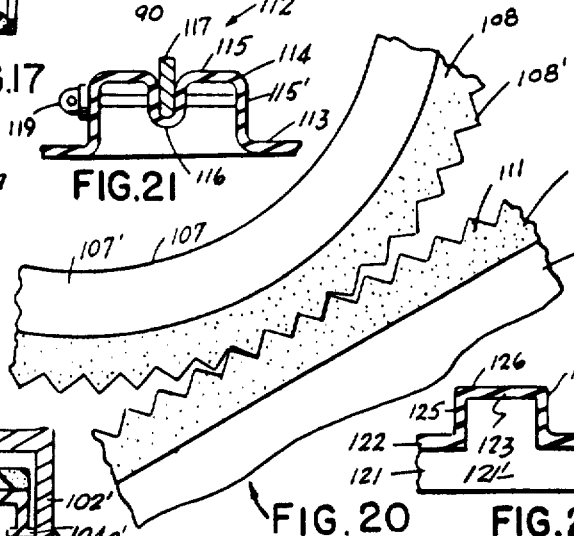
FIG. 20
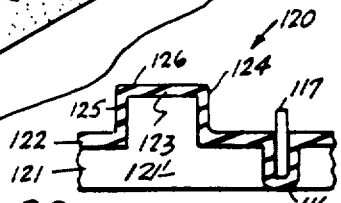
FIG. 22
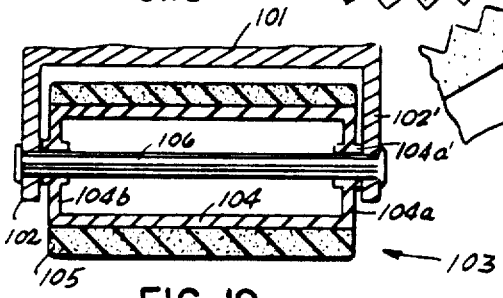
FIG. 19

TOY TRACK AND VEHICLE THEREFOR

Matter enclosed in heavy brackets [ ] appears in the original patent but forms no part of this reissue specification; matter printed in italics indicates the additions made by reissue.

[This application is a continuation of application Serial No. 834,875 filed August 19, 1959, now abandoned, and a divisional application of application Serial No. 347,532 filed February 26, 1964, now Patent No. 3,308,575 issued March 14, 1967.] *This application is a continuation of Ser. No. 71,183 filed Aug. 31, 1979, now abandoned, which is a reissue of Ser. No. 636,136, filed May 4, 1967, now U.S. Pat. No. 3,451,161.*

SUMMARY OF THE INVENTION

This invention relates to improved structures in toy tracks and trackways for guiding vehicle toys. In particular, the invention provides for toy track structures which are molded or extruded of flexible polymeric materials such as low density polyethylene, plasticized vinyl chloride, flexible ionomers and copolymers of such materials as ethylene vinyl acetate, polybutadiene styrene and other materials in shapes which are not ordinarily self supporting and in such a condition as to be limp or otherwise easily made to conform to an irregular surface such as one defined by a plurality of irregular tapered or curved upper surface blocks or bridge simulating members operative to impart a hilly terrain shape to the trackway to impart realism to the toy in simulating a roadway which is constructed and graded in hilly countryside. By fabricating toy tracks and guideways of highly flexible plastics such as those having a durometer Shore A hardness in the range of 30–40 or less, the track may be easily made to conform to steep hilly surfaces and twisted to provide banking and curve compensation without portions thereof standing off the supporting surface, a condition which is frequently encountered when more rigid plastic formulations are employed to injection mold toy tracks and the like.

Other forms of the current invention involve the provision of flexible toy trackway containing one or more wires or other shapes embedded therein for the purposes of conducting electrical energy to power or control a toy vehicle and/or for the purpose of determining the shape of the trackway. If the embedded wire is soft copper, aluminum or lead, it may be bent with the bending of the toy track or rail to make same conform to a desired shape by hand. Single or multiple rail tracks or guideways, simulated toy roadways and overhead monorails are internally provided with one or more bendable metal strips or wires permitting them to be made to conform to any desired configuration by the user on one or more base supports and/or overhead retainers constructed and positioned to permit the layout of an extended length of said tracks or rails.

In another form of the invention, one or more bendable copper or aluminum strips are partially embedded in an extrusion or molding defining a track or rail and serve the dual purpose of retaining the track in a predetermined shape as bent and conducting electrical energy to a vehicle riding thereon.

It is accordingly a primary object of this invention to provide new structures in toy tracks which may be made to conform to a plurality of shapes to improve the versatility and use of the track.

It is another object of this to provide a new and improved structure in a toy track which may be made to conform to a plurality of shapes to improve the versatility and use of the track so as to permit a toy vehicle riding thereon to follow an irregular path.

Another object of this invention is to provide a new and improved toy and a trackway for a vehicle which will permit the performance of the vehicle in a manner heretofore not possible.

Another object is to provide an improved toy guidance means in the form of an elongated guide member which may be twisted, bent or otherwise deformed into an infinite number of configurations and provided as a toy vehicle track which extends in the vertical as well as horizontal directions.

Another object is to provide a new and improved toy track of elongated shape which may be twisted about its longitudinal axis and is magnetic in characteristic whereby a toy vehicle is attracted thereto and will rotate about said axis in accordance with the twisting applied thereto and will travel upside down on said track as well as at a plurality of attitudes not heretofore attainable with conventional track.

Another object is to provide a new and improved roadtrack made of flexible plastic which will easily deform or bend oblique to the longitudinal axis thereof permitting it to be shaped into simulated gully and hill or riser portions as found in conventional country roads.

Another object is to provide a new and improved toy track for a powered vehicle, which track is so magnetized along its length for holding the vehicle against the track and is also produced of a material having a higher friction coefficient than smooth metal, thereby providing a greater degree of traction.

Another object is to provide a new and improved track for toy trains and the like which may be easily shaped according to the desires of the child into a plurality of different configurations and on which a toy vehicle may travel at steep angles without falling off.

Another object is to provide a power operated toy and a base therefor on which said toy may travel in any direction and at any attitude relative to the horizontal without falling off.

A further object is to provide improved designs for magnetic-toy vehicle wheels and closed loop drive means which may be used with certain of the embodiments of the invention and the like.

This invention utilizes plastic or rubber material in the construction of a track and/or a toy vehicle wheel or prime moving means having, in one form, magnetic [particle] *particles* therein adapted for attracting and holding said vehicle against said track by the forces of magnetic attraction whereby said vehicle may travel at various attitudes including steep inclines to the horizontal or in hanging relation on said track. In the embodiments provided hereafter one or both of the two members, track or vehicle, may be magnetized whereby it will always be attracted to the other or attract the other in a manner whereby the vehicle may travel relative to the track yet will be held thereagainst. If the vehicle wheel or drive means is made of a magnetic plastic which is magnetized, the track may be made of a similar magnetic plastic or magnetically susceptible material which need not be magnetized but which will be attracted to the former with sufficient force to hold the vehicle on the track at steep angles to the horizontal at its travels therealong.

Conventional thermoplastic polymeric materials may be utilized for both track and vehicle whenever magnetic plastic or rubber material is mentioned hereafter, it may be considered to consist of any plastic which is filled or mixed with finely divided para-magnetic particles such as micro-sized iron powders or ferrites such as barium ferrite. A particular available flexible magnetic plastic material is known as Koroseal flexible magnetic strip manufactured by The B. F. Goodrich Company which may be permanently magnetized. Koroseal flexible magnetic strip has a relatively high demagnetizing force which is over 20 times that of carbon steel and nearly twice that of the so called Alnico V magnetic material. The residual flux density of Koroseal magnetic strip is approximately 1150 oersteds and its maximum energy product ($B.H._{max}$) is 0.402 times 10. Koroseal magnetic extrusions may be magnetized in various manners including an arrangement whereby the North Pole runs continuously the length of the strip on one edge and the South Pole on the opposite edge or can have its poles across the width or thickness or along one face with the two poles along the edge or along one face with alternating poles, and in long continuous lengths. As a result it may be used to continuously attract a magnetically susceptible object such as the wheel of a toy vehicle. This invention utilizes extrusions of a flexible or rigid magnetic plastic such as Koroseal which are shaped to perform multiple other functions such as guiding a toy wheel or wheels of a toy vehicle and improving the relative forces between the two.

Wherever provided hereafter, the magnetic plastic is thus either magnetized with one pole thereof running the length of the strip member comprising the track or the tire of the vehicle wheel, or is magnetized at a plurality of positions along its length. The magnetization may run lateral to the longitudinal axis of the track or strip or parallel thereto in which the poles at a surface of the strip alternate (i.e. N, S, N, S, N, S, etc.). Any of these magnetizing arrangements will effect the attraction of a wheel made of a para-magnetic material which is not magnetized such as sheet steel or the like.

In wheel constructions provided hereafter in which either the wheel of the rim or tire portion thereof is made of a magnetic plastic, the magnetic portion or rim of the wheel may be magnetized in one of several manners. In a preferred embodiment, if the track is made of a magnetic plastic it is preferably magnetized with the same pole provided along one side of its length and the opposite pole along the other. In this arrangement, the wheel may be magnetized with its rim or tire having the same pole along the entire outer diameter or periphery thereof which pole is opposite to that of the pole of the magnetic track portion which it engages so that a maximum magnetic attraction force is derived between the two.

The invention also consists of certain new and original features of construction and combination of parts hereinafter set forth as claimed.

The nature of the invention, as to its objects and advantages, the mode of its operation and the manner of its organization, may be better understood by referring to the following description, taken in connection with the accompanying drawings forming a part thereof in which:

FIG. 1 is an end cross sectional view of a toy track made out of a magnetic plastic material and part of a toy vehicle suspended from said track;

FIG. 1' is a modified form of toy track;

FIG. 9 is an isometric view of part of a toy track in a twisted condition showing vehicles on both surfaces thereof;

FIG. 9' is an isometric view of a portion of a flexible toy track made of flexible plastic and conforming to the shape of the upper surface of a base member adapted to define the shape of the track;

FIG. 9'' is a fragmentary view in cross section of a modified form of the track of FIG. 9; FIG. 9a is a fragmentary view in section of a modified form of conducting rail and trackway;

FIG. 10 is a side view of another track and support;

FIG. 11 shows a toy track in the form of a double, closed loop helical formation supported by a thin walled cylinder;

FIG. 12 is an isometric view of a spool-shaped toy track;

FIG. 13 is an isometric view of an I-beam shaped track;

FIGS. 14 and 15 are side-cross-sections of a toy vehicle having a closed loop endless magnetic drive means;

FIG. 16 is a side view of an improved magnetic wheel for use in toy vehicles and the like;

FIG. 17 is an end-view of the wheel of FIG. 16 with the tire portion broken away for clarity;

FIG. 18 is a partial view in section of a modified form of the toy wheel of FIG. 17;

FIG. 19 is an end cross section of a modified form of magnetic toy drive in the form of an elongated wheel or drum; and FIG. 20 is a side view of a fragment of a magnetic wheel or drum having surface serrations or teeth and a surface member against which said wheel may ride.

FIG. 21 is a greatly modified track construction.

FIG. 22 is still another modified track construction.

Figure 1:
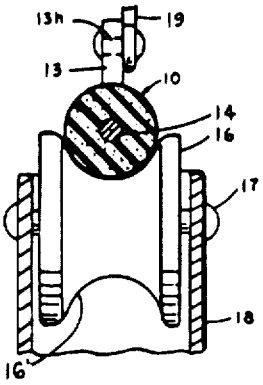

In FIG. 1 is shown the combination of a cylindrical track and a wheel held thereon by magnetic attraction in a hanging position. The wheel 17 may be used per se in a toy or may be part of a vehicle the frame or body 18 of which is suspended from the axle 17 of said wheel. In one form of the invention, the wheel 16 may be made of a magnetic material such as a ceramic magnet, Alnico, plastic or other magnet and may be magnetized while the base or track 10 is made out of a flexible or rigid magnetic material as heretofore described. In another form of the invention, the wheel 16 may be any suitable, lightweight permanent magnetic material such as steel in the form of a stamping or machined disc or a plastic filled with magnetic particles as described, while the track 10 is made of flexible magnetic particle filled plastic, the particles of which are magnetized providing said flexible track as an elongated magnet. In a further form of the invention both track and wheel or wheels may be magnetized with the magnetization of both oriented so that they create a force of magnetic attraction between the two as long as the rim of the wheel is in engagement with any part of the surface of the track 10. In FIG. [1] *1'* the track 10 consists of two portions, an outer portion 12 made of said magnetic flexible plastic and a core portion 14 made of a soft bendable material such as copper or lead. Such a combination of materials permits the cylindrical track to be deformed by hand into a desired configuration or contour such as a closed loop and/or in a plurality of bends which the wheel 16 will follow in its travel along said track as it is held thereagainst by magnetic attraction.

The flexible magnetic plastic covering 12 may be extruded over the lead wire 14 to form said track or, if the portion 12 is provided as a tube, the core 14 may be inserted therein from one end or by slitting the tube.

A number of variations are hereby proposed for the design of the track of FIG. 1. It may be provided as a solid or hollow cylindrical extrusion of flexible or rigid magnetic plastic or rubber without resort to the use of a deformable core member 14 of lead, copper, or other metal. If the cylindrical magnetic portion 12 is made of an easily flexed plastic, it may be strung between two upright supports and allowed to hang in a limp attitude whereupon the top vehicle will travel along a path dictated by the tensioning of the monofilament. If the cylindrical track 10 is made of a more rigid magnetic plastic such as a magnetic particle filled vinyl, acetate, stryrene or the like it may be used in one of several manners. It may be supported at one or both ends as a straight length of rod or tubing from which a wheel or vehicle may hang as illustrated in FIG. 1. It may also be flexed to bend in an arc between two supports. In a third embodiment, the rigid cylindrical magnetic plastic track may be bent or deformed into a plurality of simple or complex shapes including such shapes as sinewave formations, zig-zag contours, or inverse loops which are supported at both ends [by]. *By* proper magnetization of the track, a wheel such as 16 made of steel, magnetic plastic or the like may be [hug] *hung* and hang from said track as illustrated as it travels therealong. The notation 16' refers to the circular contour of the central portion of 16 which is shaped to make surface contact with a substantial circumferential portion of the surface of 12 whereby sufficient attraction is provided to hold said wheel thereagainst as it rolls along 12.

Figure 2:
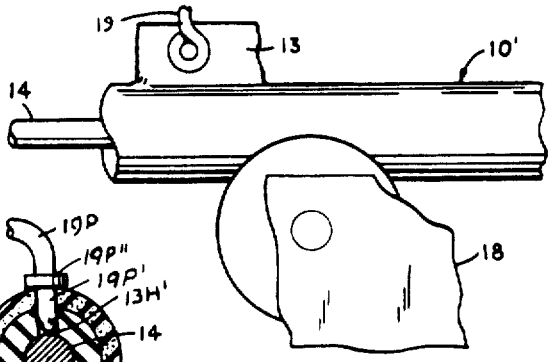
FIG. 2 is a side view of part of the track and vehicle of FIG. 1 with parts broken away for clarity.
Figure 1:
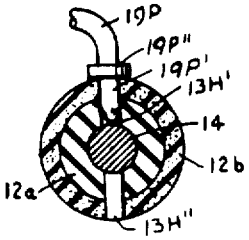

In FIG. 2 I show a side view of part of the track of FIG. 1 having bracket formation or portion 13 extending upward therefrom for supporting and holding said track in a predetermined attitude. The bracket portion 13 is shown as a flat leaf or strip formation of short length or which may extend the entire length of the portion 12 as an extruded formation thereon and which projects upward from 12 in a manner so as not to interfere with the travel of the wheel 16 therealong. FIG. 1 shows a possible end-view of 13 which is not as wide as the diameter of 12 and is integrally formed therewith. Bracket portion 13 may consist of the same material as 12 and may be molded or extruded thereon or may be another material secured to 12 by means of an adhesive, fasteners or frictional engagement therewith. The notation 13h refers to a hole through 13, *through* which a rivet or threaded fastener may extend for holding a bracket or other support against 13 for supporting the track. The support 19 of FIG. 2 is shown as a bent portion of the end of a wire finger which may extend upward as illustrated to a further support therefor to hold the track in a predetermined attitude. A plurality of the portions 13 or brackets performing a similar function may be provided along the length of 10 for supporting said track and maintaining it in a substantially fixed attitude as the vehicle travels along it.

FIG. 1' illustrates further modifications to the cylindrical track of FIG. 1 and particularly the means for securing a plurality of supports to said track for holding it away from the floor or a supporting surface so that a toy may ride suspended from said track. The cross-sectional view shows the core member 14 embedded in a central plastic core 12a which comprises a flexible plastic material or rubber over which is extruded or otherwise provided a capping layer 12b of magnetic plastic material. The construction permits a saving in magnetic plastic material by providing only the outer shell of the track 10' made thereof which portion is sufficient to support a toy or vehicle in a hanging attitude as illustrated in FIG. 1, when magnetized as described along its length.

A further feature of FIG. 1' is the provision of a plurality of holes 13H' which extend radially from the outer surface of 12 to the core member 14. The track 10' may be supported from above by means of a pin 19P, the nose [19 B'] *19 P'* of which is greater in cross-section than the area of the hole [13H] *13H'* and is adapted to be pushed therein whereby it is frictionally engaged by the material of the wall of said hole in 10'. A shelf 19P'' extending laterally from 19P engages the outer surface of 10' and permits the penetration of the nose 19P' a predetermined degree in 13H' while affording further support to the assembly by preventing the longitudinal deflection of 19P relative to 10'. A plurality of pin-like supports 19P may project from an overhead or side mount therefore each adapted to support the track by engagement in a respective hole such as 13H' extending from the top portion thereof radially to the core member 14. If the core member 14 is large enough, it may have radial holes provided therein which align with the holes 13H' and are threaded to receive the threaded end of a pin such as 19P to more rigidly support the track from above. The notation 13H'' refers to a plurality of other holes extending radially towards the core 14 through the outer jacket 12b which holes may be used to receive short pins or the like which project outward from the track and may be used to stop the forward motion of the toy thereon or to trip a mechanism for reversing the direction of the drive for said toy. It is also noted that the nose 19P' of pin 19P may be cemented or welded in the hole 13H' to permanently secure it thereto and may be shaped as its outer end in the form of a hook or eye to be received by a further supporting member such as a pin or hook projecting from one or more overhead or side mounted supports such as beams, rods or poles supported upright on the floor or table on which the track is mounted.

Figure 3:
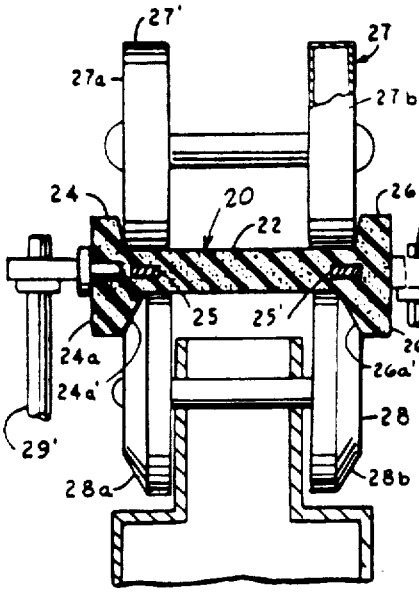
FIG. 3 is an end view in cross section of a magnetic track of ribbon or flat shape showing vehicle components riding on both surfaces of said track and further illustrating means for supporting said track.

In FIG. 3 is shown a modified form of the invention which consists of a relatively flat track 20 made of a flexible magnetic plastic material having guide means formed in both surfaces thereof for guiding the wheels of a toy vehicle along the length of said track. The track 20 consists of a central portion 22 of substantially flat, sheet-like configuration the sides of which are inflected providing side guide portions 24 and 26 which extend the length of said track and serve to define longitudinal guide means for a vehicle riding therein on either surface of said track. If the wheels of the vehicle 27 or 28 are made of steel or any other magnetically susceptible material, provided that said vehicle is light enough in weight and the force of magnetic attraction is great enough, said vehicle may ride on said track regardless of its attitude to the horizontal. Shown in FIG. 3 are pairs of wheels of respective vehicles referred to by the notations 27 and 28, each of which is shown riding against a respective surface of the track 20. It can thus be seen that if the track 20 of FIG. 3 is supported in such a manner that the support will not interfere with the travel of a vehicle on either surface of the track, a vehicle may be made to operate on one surface of the track while a second vehicle is running along the other surface thereof. It is also noted that if the track 20 of FIG. 2 is provided as a single section in which said track is twisted 180 degrees before the ends are joined then said track provides substantially a single surface on which a vehicle may ride which is continuous and of a closed loop type. In traveling a complete cycle on such a closed loop track, a vehicle will travel substantially twice the length of the track and will traverse both surfaces thereof.

The wheels 27a and 27b which are part of the upper vehicle assembly 27 are shown with a substantially flat rim 27' which affords a greater contact area with the surface of the central portion 22 of the magnetic track 20 thereby providing a greater resulting force of attraction than if a conventional rounded or beveled wheel were employed.

The wheels 28a and 28b of the lower vehicle 28 are shown with a peripheral shape adapted to engage both the surface of the central portion 22 of the track and the tapered side portions 24a and 26a. In the former construction the vehicle may have some freedom of lateral motion during its longitudinal travel along the track whereas in the latter construction the lateral motion is restricted by the mating engagement of the tapered side surfaces 28a and 28b of both said wheels with the tapered or sloped surfaces 24a' and 26a' of the side guides 24a and 26a of the track. The latter construction provides a greater force of attraction between the wheel and the track since the greater surface of the wheel is in engagement with the track and hence a heavier vehicle may be provided or a track of smaller cross-sectional area may be utilized. However, if the wheels are provided relatively wide, or are replaced with one wide wheel or drum, and the central portion 22 of the track or guideway is magnetized along its length in one of the arrangements hereinbefore described, then the additional force of attraction afforded by the illustrated sloped walls will not be needed to support the vehicle upside down as shown provided that the vehicle is not so heavy that its weight overcomes the forces of attraction. The four wheels or two drums of the vehicle may thus be of substantially shorter width than the distance between the side walls 24 and 26 of the track. In a preferred embodiment, both the wheels and track are made of magnetic plastic and are magnetized to always provide a maximum force of attraction between the two. By radially polarizing the wheels so that the same magnetic poles appear around the periphery and magnetizing the track with the opposite pole appearing on the surface against which the wheel engages, a maximum force of attraction is attained to retain the vehicle thereon.

The notations 25 and 25' refer to respective core members or wires which extend the length of the track 20 for permitting said track to retain whatever shape it is bent into. The members 25 and 25' may be made of soft, easily deformable copper or lead wire and may be replaced by a single cylindrical rod running along the length of the track or by a flat strip or sheet centrally disposed within the flexible portion thereof. As in the construction of the track of FIGS. 1 and 2, several methods may be utilized to support the track of FIG. 3 against or away from a surface in a plurality of configurations. The notation 23 refers to a securing portion of the extrusion which forms said track, which portion defines a projection running the length of said track which may be fastened to a support or bracket for holding said track off a surface. The portion 23 may have a plurality of slots or holes 23h therein the walls of which may be used to frictionally engage brackets or protruding portions from support members such as the illustrated vertical *f*hole or] rod 29 which is shown engaged in a hole through 23. 23 may also be a metal or plastic bracket bonded to the side of the track or held thereagainst with fasteners. At the other side of said track is shown a hole 23H extending partially into the [trackform] *track from* the side surface thereof in which a pin or protrusion from an upright bracket or pole such as 29' may be forced to frictionally engage and hold said track away from a surface. Numerous other securing means may also be provided such as spring loaded clamps, clips, wires, cord or rods from which said track may be suspended or on which said track may rest.

Figure 4:
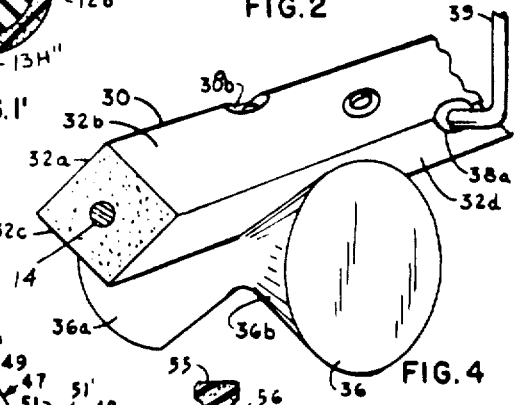
FIG. 4 is an isometric view of a rectangular cross section magnetic track and a toy object adapted to be supported by and ride on said track [and] *in* a plurality of attitudes.

Many variations in the cross-sectional shapes of the track of FIGS. 1 and 3 are possible without departing from the spirit of the invention. For example, the cylindrical track of FIG. 1 may be replaced by a triangular, rectangular or any desired cross-section of an extrusion which will serve the desired end purpose. The track of FIG. 4 is shown as being square or rectangular in cross-section which provides four pairs of surfaces against which a wheel such as the V-shaped wheel 36 of FIG. 4 may ride. The V-surfaces of the track: 30 of FIG. 4 provide not only substantial areas of contact with the surfaces 36a and 36b of the V-section of the wheel but also serve as a guide and support for said wheel when it is attracted thereagainst. The wheel 36 may ride on top of 30 since it is prevented from falling sidewards by the pairs of surfaces 32a and 32b which define the upper surfaces of 30 or may hang in the attitude illustrated in FIG. 4. If 30 is positioned properly relative to further guide means for the wheel or wheels 36, said wheel may ride on either of the pairs of surfaces 32a, 32c or 32b, 32d. The track 30 may comprise an outer portion 32 with a centrally disposed core 34 of lead or copper as described or many be made out of flexible or rigid magnetic plastic which comprises the portion 32 per se, depending on the desired method of shaping and supporting said track.

A novel method of mounting and supporting the track 30 of FIG. 4 is illustrated in which one or more holes are provided normal to a surface of 32 or along an edge thereof. The hole 38a is shown provided along the intersection of the walls 32b and 32d in which a pin or rod may be frictionally engaged and held for supporting the track off a surface. The notation 39 refers to a pin or rod frictionally engaged in hole 38 which pin extends downward to said track from above and therefore does not interfere with a wheel or wheels such as 36 traveling along the surfaces 32c and 32d. The holes 38 are preferably small enough such that the wheel will roll over without being interrupted in its travel along the track.

Figure 5:
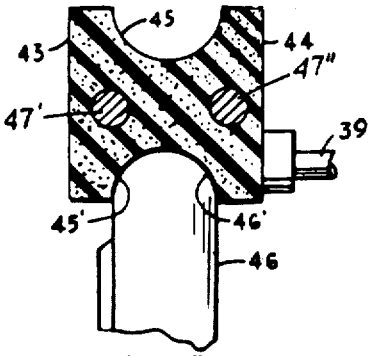
FIG. 5 is an end view of a magnetic plastic track having a plurality of longitudinal guide-channels or grooves formed therein.

An interesting modification utilizing the track of FIG. 4 is derived by deforming or providing said track with a plurality of twists therein along its length to define a plurality of spiraling surfaces along which the wheel or a vehicle will travel in a spiraling path provided that the support means for said track will not interfere with the travel of said wheel or vehicle. In FIG. 5 the track of FIG. 4 has been modified. The track 40 consists of a magnetic plastic portion 42 of substantially rectangular shape having flat side walls 43 and 44 and a pair of cylindrical grooves 45 and 45' extending into said portion 42 from the top and bottom surfaces thereof. The cylindrical grooves 45 and 45' define surfaces against which wheels 46, peripherally shaped as at 46' to conform to said surfaces may ride. The cylindrical groove thus provides in addition to a means for increasing the area of contact with the peripheral surface of the wheel, a means for guiding said wheel in its travel along the length of 40. It is noted that the somewhat square cross section track of FIG. 5 may be replaced by a flat extrusion of rectangular cross-section having two or more cylindrical or V-shaped grooves such as 45 and 45' provided therein running parallel to each other along one or both of the major surfaces thereof to guide respective side wheels of a toy vehicle adapted to ride thereon. A pair of deformable metal cores 47' and 47'' as described may or may not be provided running the length or part of the length of said track for maintaining a predetermined shape thereof. Magnetization may be effected in a direction either perpendicular or parallel to the axis of rotation of wheel 46 with the same pole (S) provided at the surface of each of the grooves or channels.

A plurality of spaced apart holes may be provided in the side walls of the magnetic plastic portion 44 on either or both sides thereof for receiving and frictionally holding pin-shaped supports such as 39 for holding said track off a surface.

Figures 6, 7:
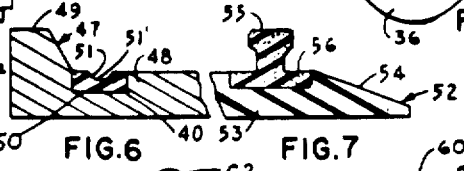
FIG. 6 is a partial view in end-wise cross section of a toy vehicle track having a strip of magnetic material secured in a groove therein for attracting a wheel of a toy vehicle.
FIG. 7 is a partial end-wise in cross section of a toy vehicle track having a rail for guiding the wheel of a toy vehicle secured thereto, which is made of a magnetic material.

In FIG. 6 is shown constructional details of at least part of a toy track for guiding a toy vehicle in a plurality of different attitudes including steep slopes to the horizontal or even upside down as heretofore described. Since most magnetic materials are relatively expensive and need not be used in the construction of the entire track bed for a toy vehicle, particularly if said track bed extends the width of the vehicle or greater, it will often be desirable to provide said magnetic material only in the area of the track immediately below or adjacent either or both of the wheels of the vehicle riding on the track. In FIG. 6 the track bed 47 is illustrated as having a central flat portion 48 with a pair of side walls or guides, one of which 49 is illustrated for preventing lateral movement of the vehicle. One or more longitudinal channels 50 are provided in the central portion of 48 into which may be frictionally or otherwise secured respective magnetic strip or bar elements such as 51. If both the track 49 and the magnetic bar 51 are made of flexible plastic or rubber, then said track may be made to conform to a plurality of configurations as described. The strip 51 may be heat sealed or adhesively bonded in the channel [40] *50* of 47. Said bar 51 is illustrated as having a semi-cylindrical groove 51' formed in its upper surface which may receive part of the peripheral surface of a vehicle wheel for laterally guiding said wheel therein. As in the construction of FIG. 5, the groove 51' may be V-shaped, rectangular, or any suitable shape for receiving the surface of the peripheral of the wheel having a similar cross section.

In FIG. 7 is illustrated constructional details of a fragment of a toy track 52 having one or more rails 55 secured to a surface thereof for guiding a vehicle having wheels adapted to ride on said rails. The rail 55 is illustrated as being made of a magnetic material such as the described magnetic plastic and is secured to 52 by means of a flange portion 56 thereof which is inserted into and heat sealed or adhesively bonded in a groove 57 in 52. The central portion 53 of 52 extends to a tapered side portion 54 and the construction illustrated is repeated for the other half of the track, not shown.

Figure 8:
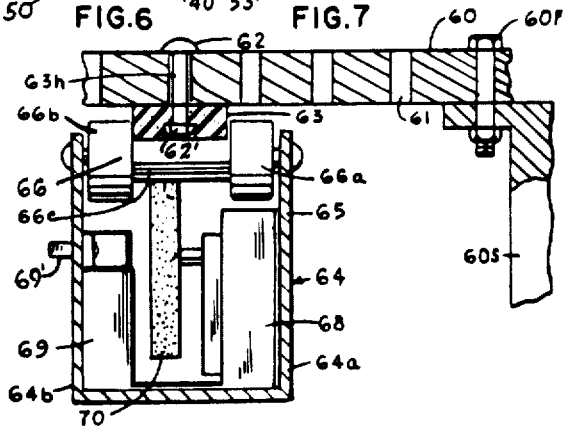
FIG. 8 is an end view in partial cross section of a magnetic toy track and vehicle suspended therefrom.

In FIG. 8 is illustrated a further design for a magnetic toy track and a means for mounting said track, and also shows a vehicle riding in a suspended attitude thereon. The magnetic track 63 is shown as rectangular in cross section and is provided in any suitable length. The end view shows the track 63 as being secured to the undersurface of a board or plate 60 having a plurality of small holes 61 provided therethrough at equal intervals throughout the board which may be used to receive and hold fasteners 62 such as short machine screws which pass through spaced-apart holes 63H in member 63. The fasteners 62 are just long enough to extend to the bottom surface of 63 and the holes 63h therein are countersunk to receive the nuts 62' for the screws 62 for holding 63 in clamping engagement against the lower surface of 60. If the plastic of which 63 is made is flexible, said track may be laterally deformed into one or more curves or even U-loops to make it a closed loop track or the like under the board 60. If 63 is made of a sufficiently rigid plastic, the holes 63h may be threaded to receive the threaded ends of the fasteners 62 and the nuts 62' may be eliminated. In a further embodiment said nuts 62' may be molded in or otherwise bonded to the track 63 for receiving the ends of the fasteners 62.

A toy vehicle 64 is shown having a wind-up or battery powered motor 68, secured in a housing 65 which is the body of the vehicle, is adapted to rotate a drive member 66 with plural cylindrical portions 66a, 66b and 66c, the latter being adapted to ride against the track 63 and is magnetically attracted thereto. In other words, the cylindrical unit 66 is made of a para-magnetic material and is preferably, though not necessarily, magnetized.

Secured to the shaft 68' of motor 68 is a friction drive wheel 70 made of rubber or plastic, the peripheral surface of which is adapted to ride against the central portion 66C of the cylindrical drive unit 66. Unit 66 is provided with end portions 66a and 66b of greater diameter than the central portion 66C and is shaped so that the bottom surface of track 63 as well as at least parts of the side surfaces thereof are engaged by a plurality of surfaces of member 66. The notation 69 refers to a battery which is electrically connected to a switch 69' and the motor 68 which powers said motor when said battery switch is closed. A second axle member similar in shape to 66 is preferably also rotationally mounted and supported in bearing by the side walls 64a and 64b of the vehicle 64 as is 66 providing a stable vehicle with sufficient attraction means to hold it against the track 63.

The plurality of holes 61 in 60 are spaced such that the track member 63 may be adjusted and held in a plurality of different curved and/or straight portions in accordance with the desires of the person assembling said track on the surface of 60. The notation 60S refers to a beam or pole for supporting the board 60 horizontally disposed and vertically spaced from a surface such as the floor. The lateral portion 60S of 60 is provided with a hole therethrough for engaging a pin or fastener 60F which may be used to secure 60S to the board. If the board 60 is made of a transparent material such as plastic or glass the vehicle 64 may be viewed from above as well as below. The board 60 may also be vertically disposed or at any angle to the horizontal and the vehicle adapted to travel up and down thereon. In a further embodiment the board 60 may be plywood or other material shaped with one or more permanent deformations or curved portions thereof, the fasteners 62 serving to maintain the track 63 thereagainst so that an irregular track formation is provided. If the base 60 is the surface of a large ring or cylinder the track 63 may extend in a closed loop around the interior of said cylinder or ring and/or about its exterior surface. The track 63 may also be shaped around the cylinder in a spiral path. The spiral path may be a closed loop path which extends about the exterior surface of the cylinder and when it reaches one end thereof continues on the inside of the cylinder to return to the other end whereafter it extends over the edge of the cylinder to the surface thereof and continues in a spiral path about the exterior surface.

FIG. 9 illustrates a magnetic track 20' having both surfaces thereof adapted to receive a powered vehicle and shaped somewhat similarly in cross section to the track 20 of FIG. 3. Said track 20' is supported along either or both edges by vertical beams 72 and 73 in approximately the attitudes shown and is illustrated with a half twist provided therein between the two beams. As a result the vehicle A traveling along the track near beam 73 to the left will follow said twist 20'T in the roadway and near the beam 72 will be riding upside down thereon as illustrated at A'. The vehicle B is shown directly over the vehicle in the position A' which condition may be simultaneously derived using a magnetic track of the type described.

If there is no 180-degree twist such as at 20'T in the track 20', it is noted that one vehicle such as B may continuously ride the upper surface of the track while, at the same time, a second vehicle may continuously ride the lower surface thereof to give an effect in toys not heretofore derived. The mounting of the track 20' between the two uprights 72 and 73 may be effected by means of pins 29P extending from respective holes 24 in the side walls of the trackway to respective holes 72H and 73H in the respective uprights. The track 20' of FIG. 9 may be provided in a closed loop and may be adjusted to extend at any angle to the horizontal since the magnetic attraction afforded thereby to the vehicle will hold it thereon at any attitude. If said track 20' is oblique to the horizontal the vehicle may be made to travel thereon and rotate 180 degrees as it moves longitudinally by means of the twist under the action of gravity alone.

FIG. 10 illustrates the mounting of a cylindrical track member such as 10 of FIG. 1 between two uprights 72" and 73" by means of pins 29P which are frictionally or otherwise engaged in the respective holes 72H and 73H of said upright and frictionally engage the bracket portions 17 of the track. A track 10T is made in accordance with the teachings of FIGS. 1 or 1' it may be twisted into one or more curves or loops between the uprights 72 and 73 which shape it will maintain while the vehicle rides therein by means of the bendable core member 14.

If track 10T is made of a flexible magnetic plastic material such as described without the core member 14 and the characteristics of said plastic is such that it will hang limply and deform either under its own weight or the combination of its weight and the vehicle, said vehicle 18' will travel thereon in path defined by its own weight and when it reaches the vicinity of either of the uprights 72" or 73" it will be traveling at an angle which is greater than that which it is traveling when near the center of said track.

The two described means for securing the cylindrical track 10 of FIG. 10 to an upright support therefore are illustrated. The L-shaped pin 29 is secured at one end in a hole 73H in the upright 73" and frictionally engages the top hole 13H' in the track 10. The notations 72"b and 73"b refer to base supports for the respective uprights 72" and 73". A toy vehicle 18" in the shape of a mock animal or other toy figure is shown magnetically attracted to the track 10 and suspended upside-down therefrom along which it is driven by means of an internally mounted motor. The vehicle and track may be made in accordance with the teachings of FIGS. 1 to 8 or modified as hereinafter described.

FIGS. 11 and 12 illustrate track and toy vehicle guideway configurations in the realm of this invention which are adapted for guiding one or more toy vehicles in a plurality of directions and attitudes thereon. In FIG. 11 a track or guide 76 for a powered toy vehicle 78 is shaped into a helical formation which is a closed loop formation. A thin walled cylinder 75 is provided to support the helical trackway 76, which cylinder may either be made of a transparent or opaque material. The guide 76 extends as a narrow strip in a helical formation around the exterior surface 75a of cylinder 75 from one end to the other and at each end extends over the rim of the cylinder and continues as a helical formation along the inside wall to the other end where it bends over the edge thereof and continues the helix. The notation 76' for example refers to that portion of the formation 76 which extends over the upper rim 75' of the cylinder 75 and the notation 76" refers to that portion of the formation 76 which winds around the inside surface 75b of the wall of cylinder 75. If a powered toy vehicle 78 is adapted to be magnetically attracted to the formation 76 and/or the material of the cylinder 75 by any of the means described elsewhere in this specification and the twists or bends such as 76' in 76 are not too acute, then said vehicle may be made to continuously travel along the double helical path defined by 76 from one end of the cylinder to the other and then back again on the other surface thereof. Accordingly, the formation 76 may be made of a magnetized magnetic plastic material in accordance with the teachings of FIGS. 1 to 8 with one or more wheels of the vehicle 78 adapted to ride thereon and/or against the surrounding cylindrical surface. All wheels of the vehicle may be adapted to ride against 76 or one or two of a plurality of wheels depending from the body of 78 may ride thereon with the remaining two or four wheels riding against the surface adjacent 76.

In the embodiment of FIG. 11, the powered wheel or drum depending from the vehicle 78 is adapted to ride against and be guided by the helical strip formation 76 in accordance with the teachings of FIG. 8 so that when a vehicle travels over the rims of the guideway, as at 76', it will be maintained in motion since the drive wheel never leaves the strip 76 even though the attitude of the vehicle may suddenly change acutely. The strip formation 76 may be bonded to the surfaces of cylinder 75 or secured as taught in FIG. 8. If the cylinder 75 is made of a paramagnetic material such as sheet steel, then the strip 76 need not be made of magnetic plastic if the wheel, wheels or drive drum of the vehicle is made of a magnetic material as described.

In order to maintain the cylindrical assembly 74 away from a surface so that the vehicle 78 will not be prevented from traveling its closed loop path over or around the lower edge of the cylinder, said cylinder assembly is maintained the necessary distance away from a surface on which it rests by means of a stand 77 which comprises a single formation of bent tubing, wire or the like with leg portions 77a and 77b and a base portion 77c adapted to rest on the supporting surface therefore, or may be a plurality of legs such as 77' secured to the side wall of the cylinder in positions whereby they will not interfere with the movement of the vehicle as it travels along the formation 76. The notations 77d and 77d' refer to portions of 77 which are welded or secured to 75 with fasteners. It is noted that legs or other formations of any suitable shape may be molded or otherwise provided as an integral formation depending from the cylinder. By means of two formations such as 77, one at each of the cylinder, the formation 76 may either stand as illustrated or be provided in an attitude with the longitudinal axis of the cylinder horizontal so that the vehicle will travel the path of a horizontally extending helix.

In FIG. 12 is shown another form of guideway for travel of a vehicle thereon in a closed loop path. The trackway 79 is in the form of a large spool or the like and is preferably made of sheet material. The central cylindrical portion 80 provides a cylindrical surface 80' on which the powered toy 81 may travel and is preferably wider than the width of the vehicle so that the latter is not confined in lateral movement thereon. Lateral guides for the vehicle 81 which prevent it from running off the cylinder, are provided by the two side flanges 80a and 80b of the spool, which flanges are sufficiently large in diameter to position the central cylindrical surface 80' of 80 far enough away from the supporting surface on which the spool 79 rests to permit the vehicle to continue its travel completely around 80'. If the spool 79 is positioned with one of its rims or end plates 80a or 80b resting against the supporting surface therefore, one or more vehicles 81 may travel in a cylindrical path which is always normal to the supporting surface.

The means for maintaining the vehicle 81 against the surface 80' may be any of the techniques provided elsewhere herein. The wheels of the vehicle 81 may be magnetized as described whereupon 80 may be made of sheet steel or the like. A track formation as provided in FIGS. 1 to 8 may extend completely around 80 in a closed loop to maintain 81 thereagainst in any attitude as described.

FIG. 13 shows a portion of another design for a toy trackway which is similar in certain respects to that illustrated in FIG. 12. The trackway 82 may be made of rigid or flexible paramagnetic material and its cross section is similar to that of FIG. 3 save that vehicle riding on either surface thereof have wheel spreads which are substantially less than the spread of the sidewalls 82a and 82b of the track. Said track 82 is shown with a central roadway portion 82c having side portions 82a and 82b which extend as guide-walls from both surfaces of 82c. The guidewalls prevent a vehicle riding on either of the major surfaces of the track from laterally traveling off the track and maintain it on the surface of the central portion as it travels along. The trackway 82 may be made of any paramagnetic material such as sheet steel, magnetic plastic or the like or may have formations in the central portion 82c provided in accordance with the structural teaching of FIGS. 6 or 7. The trackway of FIG. 13 may be shaped in any suitable longitudinal configuration or contour such as an oblong, closed loop track or a cylindrical configuration as shown in FIG. 12. If FIG. 13 shows the track which includes a similarly shaped portion extending in a closed loop with the configuration illustrated, the vehicle A will be traveling upright thereon when traveling on the upright portion of the surface of 83a as illustrated and will travel upside down as at A' after 83a has reversed in direction and becomes the bottom surface of the trackway as illustrated. Similarly, vehicle B is shown traveling upright on surface 83b after having traveled upside-down underneath the trackway as at B'. The extension of the side wall portions 82a and 82b is thus preferably a sufficient degree outward from the central portion 82c to permit the vehicle B to clear the surface on which the edges of the walls rest so that the vehicle will not be restrained from its closed loop path and may travel upside down as at B' on surfaces 83b.

FIG. 14 illustrates a further embodiment of the invention in which a vehicle is driven along a track by means of one or more closed loop belts secured to said vehicle and driven in a closed loop path thereon. The track S4 of FIG. 14 may be made of a magnetic or magnetically susceptible material and may or may not be magnetized depending on the characteristics of the closed loop belt 87 of the vehicle which is driven around at least two drums or sprockets 88 and 89 which are supported in bearing on shafts 88' and 89' by the body 86' of the vehicle 86. By power operating one of said shafts the belt 87 may be made to travel a closed loop path and engage the upper surface 84' of the track 84 along the longitudinal portion 87' of its loop which extends beneath both wheels or drums. With sufficient friction between the surface of the belt 87 along the length 87' thereof and the surface of 84, the vehicle will be driven forward. However, such friction will not ordinarily be developed unless said belt is shaped with cleated portions formed laterally therein and said vehicle is traveling on a surface which is substantially horizontal. However, in FIG. 14, I provide said belt 87 made out of a flexible magnetic plastic or rubber material of the type heretofore described which may be magnetically attracted to the track 84 with sufficient force to cause the length 87' between the two drums 88 and 89 to drive the vehicle forward even when the track is at a relatively steep angle such as illustrated. Depending on the weight of the vehicle and the relative force even when the track is at a relatively steep angle such as illustrated. Depending on the weight of the vehicle and the relative force of magnetic attraction between the surface of the belt engaging the track 84, said vehicle may even hang upside down from the track and be driven there along by the closed loop movement of the belt.

One of several combinations of materials may be provided for the belt and track of FIG. 14. For example:

(a) The belt 87 may be made of a flexible magnetic plastic material which is magnetized along its length sufficiently to cause it to be attracted to the surface of the track 84 which may also be made of a magnetic plastic material or sheet metal such as sheet steel. In this embodiment it is not necessary to magnetize the track.

(b) The belt 87 may be made of a flexible magnetic plastic or rubber which is not magnetized but which is attracted to the track 84 which is made out of a magnetizable material which is magnetized.

(c) The belt 87 may be made of a plurality of hinged sections made of plastic, metal or any suitable material each of which contain a small permanent magnet which becomes attracted to the magnetically susceptible track 84 which may be made of sheet metal or magnetic plastic which is not magnetized.

(d) The belt 87 may be made in a plurality of hinged sections of rigid magnetic plastic each of which is magnetized in a manner such that it will be held against sheet steel or the like comprising the track 84. Such a vehicle could be made to travel vertically up and down the surface of a steel cabinet and the like.

(e) The belt 87 may be a flat sheet or a cylinder of flexible magnetic plastic material which is sufficiently flexible to be driven around sprockets or drums 88 and 89. Since the magnetic particles have a tendency to weaken the plastic in which they are embedded, the belt 87 may be reinforced with a core of synthetic fibers, threads or a single cloth or thread member embedded therein or laminated thereto on the internal and/or external surfaces thereof.

Further features of the toy vehicle 86 include a battery 93 operatively connected for powering motor 90. The motor shaft is coupled to drum shaft 88' through bevel gears 91 and 92.

In FIG. 15 the vehicle 86 is shown climbing a steeply inclined base 84 by engagement of the moving magnetic belt 87 therewith. The top 84' of 84 may be sheet steel, plastic coated steel or magnetic plastic coated metal, wood or other material.

FIGS. 16 and 17 illustrate a design for a magnetic wheel for the use in propelling toys and the like. Whereas the entire wheel may be molded of magnetic plastic material and magnetized in a plurality of areas peripherally about the wheel for attracting and maintaining said wheel, together with others rotationally mounted thereon, against a paramagnetic surface such as steel or other material as described in FIGS. 16 and 17, only a circular band 97 of magnetic plastic is provided and is peripherally secured to hub 96 of wheel 95 which will suffice for supporting the wheel without the use of magnetic plastic material for the central portion of the wheel which would ordinarily not serve any function other than to form said wheel. Furthermore, if the hub portion 96 is made of a light material such as magnesium, a weight saving will be effected permitting the wheel and the assembly from which it extends to hang upside down from a paramagnetic surface with less chance of falling off.

The band 97 is provided with a centrally disposed and projecting inner rim portion 97' which is adapted to mate with a circular cavity in the periphery of 96 to prevent the band from coming off the wheel. An adhesive may also be used to bond 97 to 96.

FIG. 18 shows the structure of a wheel with a magnetic plastic tire or band circumscribing the periphery thereof which is peripherally shaped with an indentation therein adapted for engaging the surface of a track member. The wheel 99 consists of a hub 95' having an annular band or tire 100 which is mechanically and/or adhesively secured to the outer rim of 95'. The wheel portion 95' is made with an axle portion secured thereto or adapted to receive a wheel portion in rotational engagement thereon as is 95 of FIG. 16. The circular cavity or groove 100' in 100 is shown as being substantially semi-cylindrical in cross-section and is adapted to ride against a cylindrical tube or wire of steel or rod or tube of magnetic plastic material. Like the rim member 97 of [FIGS. 13 and 14] *FIG. 17*, the tire 100 is preferably magnetized for 360 degrees about its perimeter with the same polarity of said magnetization provided about the outer surface, defined by the surface face of the channel 100', and the opposite polarity provided around the inside portion of the tire section. The [semi-cylindrical] surface of the cavity 100' offers a substantially greater contact surface [for engagement with the track, wire or body] on which said wheel may ride and furthermore a means for guiding said wheel and preventing its lateral movement on the track. If the cavity 100' is V or wedge shaped, a rectangular steel wire or magnetic plastic formation or upper portion thereof may be employed against which the magnetized tire may ride and be guided and held by means of the magnetic force of attraction. An adhesive may be used to bond the tire 100 to the rim of 95'. If the material of which 100 is made is a flexible material such as the vinyl filled Koroseal, the member or tire 100 will serve the further function in that it will provide shock absorption to the vehicle from which it depends and will further provide a surface with a greater degree of traction than a smooth metallic surface of the conventional toy wheel which traction will be enhanced by the forces of magnetic attraction which increase the friction between the tire and the surface against which it rides and the deformation of said tire when it is attracted to the surface.

FIG. 19 shows a modified form of toy drive means which comprises a cylindrical wheel or drum 103 which is rotationally supported by the side walls 102 and 102' which depend from the body [10] of the toy vehicle 101. The cylindrical drum 103, shown in cross section consists of an inner drum 104 made of plastic or any other suitable material which mounts and supports a cylindrical sleeve 105 made of magnetic plastic material which is bonded or otherwise secured to the exterior cylindrical surface of 104.

The cylindrical sleeve 105 is preferably magnetized such that its outer surface is all of one polarity and its inside surface is of the other polarity, although other magnetizing arrangements may also be provided which will maintain the drum against a paramagnetic surface during its rolling movement thereacross. The notations 104a and 104b refer to end walls of the inner cylinder 104 which support or have integrally molded therewith respective bearing hubs 104a' and 104b'. It is noted that the cylinder 103 may be molded or extruded entirely of magnetic plastic material in the hollow shape illustrated with bearing supports such as 104a and 104b bonded to the ends of the cylinder or also of said magnetic plastic material or may be molded as a solid cylinder with a shaft such as 106 running therethrough for rotationally mounting it on a toy such as illustrated.

The magnetized cylinder 103 may have its shaft 106 directly coupled to a gear-motor or may be driven by a frictional drive means in the manner illustrated in FIG. 8.

In FIG. 20 is illustrated a structural modification to any of the drives illustrated in FIGS. 11 to 16. If the aforedescribed toy vehicle is sufficiently light enough in weight, it may be made to climb very steep grades or hang upside-down on a paramagnetic surface as illustrated in FIGS. 14 and 15. However, if the vehicle is relatively heavy, it may easily slide down a steep incline or tumble off due to the inability of the forces of magnetic attraction between the vehicle drive means and the magnetic drive or coupling means with a plurality of irregularities adapted to mate with each other, a further supporting means is provided which, when combined with the resulting force of magnetic attraction will maintain the wheel or belt in intimate contact with the base at very steep angles. In other words, the maintenance of the vehicle against the track or surface is not only dependent upon the friction developed as the result of the force of magnetic attraction which increases the coefficient of friction between the two surfaces, but also depends on the reaction of the irregularities in the base or track which individually support some of the weight of the vehicle which weight is transmitted normal to said irregular surfaces.

In FIG. 20 the track or base consists of a base member 109 the upper surface of which is capped or coated with a magnetic plastic material as a layer or sheet 110 having laterally extending serrations or projecting ribs 111 formed therein. The drive unit 106 consists of a base member 107 which may be the wheel hub or a belt member on the exterior surface of which is mounted a capping member or tire 108 which is exteriorly shaped with a plurality of rib formations 108' adapted to mate with respective of the rib formations 111 of 110. Thus as 106 travels relative to the track 109, several of the peripheral rib formations thereof will be mating with respective of the rib formations or irregularities 111 which will be maintained in surface abutment with each other by the resulting magnetic attraction forces and the drive unit 106 will ride against 110 at steep angles to the horizontal without falling or sliding off. 106 may represent a wheel or drum made in accordance with the teachings of FIGS. 13 to 16 or may be made entirely of magnetic plastic material shaped into a wheel or cylinder as described.

It is noted that the sheet plastic and metal strip structures illustrated in FIGS. 21 and 22 may be applicable to products other than wheeled toy tracking.

FIG. 21 illustrates a form of the invention wherein a toy trackway of the type described is provided with simple means for providing electrical energy for a vehicle riding thereon. The trackway 112, a portion of which is illustrated in cross section which is taken across a longitudinally extending rail or guideway portion 114 thereof. The track 112 includes one or more portions 114 integrally formed with the base 113 which project upwardly therefrom, and serve as means for retaining a thin strip 117 of metal in a position whereby its upper edge will make contact with a wheel or brush element subtending from the vehicle traveling along the track and guided either by formation 114 or another formation extending parallel thereto. The base 113 is preferably fabricated of thermoplastic material such as a sheet of thermally deformable polymer capable of having formation 114 provided therein as well as other formations to define the guide ways for a toy vehicle as well as retaining means for strip 117 and other similar strips necessary to complete one or more circuits with the vehicle electrical drive means for the vehicle traveling thereon. In one form of the invention, the upper surface 115 and/or surface of the side wall 115' of formation 114 may serve as means for guiding the wheels of a vehicle riding thereagainst. In other words 114 may serve as a rail for a toy train or motor car and/or as means for securing and positioning conductor strip 117 relative to the toy vehicle.

Centrally disposed in formation 114 is a fold or formation 116 in the plastic sheet provided therein by molding such as by vacuum or pressure forming and having walls shaped to receive and preposition the strip 117 whereby the upper edge of said strip extends a predetermined distance above the upper surface of 113. The width of the fold [117] *116* is substantially the width of strip 117 which strip is preferably frictionally retained between the side walls of 116, cemented or otherwise bonded in place. A metal pin or fastener 118 is shown extending through holes in the side walls 115' of 115 and 116 and through a hole in strip 117 in a manner so as to be electrically connected to the latter and retain it in place in the channel formed by 116. The head 119 of pin 118 is shaped to receive an electrical wire and the body of 118 is in surface engagement with or welded to 117 so as to make electrical connection therewith so that the strip may be electrically connected to one terminal of a battery or switch connecting it to a battery. Thus, is two parallel formations such as 114 are provided, each retaining a respective strip 117 of metal or other suitable metal shape and each connected in circuit with a power supply, then said two parallel strips may be used to provide continuous electrical connection between said power supply and the vehicle driving motor or other device mounted on the vehicle through either the vehicle wheels or brushes extending therefrom to make contact with 117.

In FIG. 22 another construction in a track formed of thermoplastic material by molding a sheet of said material with indentations or projections therein is described. The trackway 120, a portion of which is illustrated in lateral cross section, includes a base 121 made of thermally deformed sheet plastic which has a rail-like formation 123 in its upper surface protruding upwardly therefrom to define means for guiding wheels of a toy vehicle or for guiding a formation of the vehicle riding thereagainst to define the path of travel of said vehicle. Formation 123 is formed in the top wall 122 of trackway 121 and has side walls 124 and 125 and a top wall 126 against which portions or wheels of the vehicle may ride. Formed in and downwardly protruding from the wall 122 of 121 adjacent and parallel to 123 is a fold formation 116 defining closely positioned sidewalls for receiving, retaining and prepositioning a strip 117 of metal adapted to function as described as means for contacting a brush element or metal wheel of a vehicle as it travels the path defined by one or more formations such as 123. Notation 121' refers to side walls for the trackway which depend from the top wall 122 and provide rigidity to the trackway. If sidewalls 121' are eliminated, formations 123 and 116 may suffice per se to define the shape of the track.

The sheet plastic and metal strip structures illustrated in FIGS. 21 and 22 may be applied as a toy track or game board in which two or more strips such as 117 extend in a closed loop path parallel to projecting formations such as 114 or 123 or to indentations in the sheet serving to guide the wheels of a toy vehicle. The structure may also be provided as one of a plurality of elongated tracks or roadway portions adapted with the ends of the sheet plastic or metal adapted to be secured to the ends of other straight and curved sections of similar track for constructing a length of trackway consisting of a plurality of such sections in which the strips 117 are electrically connected to each other when the sections of track are mechanically secured together by shaping the ends of strips 117 to contact and electrically connect with similar strips secured to adjacent track sections.

The structures illustrated in FIGS. 21 and 22, with certain modifications to the shape of the plastic sheet porstrips are spaced close to, but not touching, each other than toy trackway. For example, two or more metal strips such as 117 may extend in respective folded or deep drawn recesses such as provided by formations 116 whereby said strips are spaced close to, but not touching, each other along certain portions of a game board and are positioned farther apart along other portions of the game board which is defined at least in part by the plastic sheet. If the width of the strips 117 is such that their upper edging protrudes less than 1/32" above the upper surface of flat portion 122, a ball made of metal may be rolled across the surface and will complete a circuit when rolling over two closely spaced portions of two such strips in parallel circuit with a power supply such as a battery and a scoring device such as an electrical counter, bell or light to indicate scoring. Metal objects such as discs, coins, etc. may also be tossed against the surface to effect scoring when they land on and complete a circuit across two closely spaced portions of two strips. The structures shown in FIGS. 21 and 22 wherein strips or other shapes of metal are held in shaped recesses or folds provided by vacuum forming plastic sheet may also be used in various devices and products employing electrical circuits and connections to batteries or other devices may be made to the ends of such conducting strips 117 or as illustrated in FIG. 21. The portion of the strip 117 which protrudes above the surface of the board portion 122 may also be shaped, punched or otherwise fabricated to effect a wire lead connection thereto. The strip 117 may be held in place by friction and/or adhesive means and/or one or more fasteners such as grommets piercing the side walls of fold 116. Strip 117 may have various cross sectional shapes and may be beaded or U-shaped at the bottom to retain it in place in the channel defined by the fold. In a preferred method of manufacture, strip 117 may be assembled in a channel in the mold against which the sheet 113 is deformed in a position whereby said plastic sheet is vacuum or pressure formed over the strips in a manner to secure them to the formed sheet so that when the sheet is removed from the mold, the strips are attached thereto by friction.

FIG. 9' shows a modified form of the invention in which a section 20" of flexible track or roadway is shaped to conform to a surface on which its bottom surface 20"C rests or is secured to. Whereas the conventional track or roadway is made of rigid plastic or metal which is preshaped and has a substantially flat bottom surface, the trackway section 20" of FIG. 9' is preferably made of a flexible plastic material such as polyethylene, polyvinyl chloride, acetate or other polymers which, in the thin cross section illustrated or modifications thereof, is sufficiently flexible so as to permit it to easily conform to an irregular surface or member provided to define a shape other than planar. Plural spaced apart tracks or wheel runner portions 24" and 26" are shown integrally formed in the upper surface 20"D of the trackway 20" by molding, vacuum forming or extrusion. The generic term thermoforming will be used to define all methods by which said rails or tracks are formed in said upper surface of the flexible track. The central portion 20"B of the illustrated portion of trackway 20" is shown draped over a block 21 with a curved upper surface 21' which defines the shape of the track or roadway, conforming to said curved surface, as a hump in the road. In other words, the portion 20"B of the trackway, which extends from portions 20"A either side thereof which lie flat, simulates a small hill or rise and fall in a conventional roadway which construction or configuration is not possible using conventional trackway made of rigid plastic, wood or metal unless said formation is permanently provided therein.

In constructing a track or roadway layout employing track of the type illustrated in FIG. 9', a plurality of bottom supporting and surface defining members of the same [of] *or* different shapes such as 21, may be employed along different portions of the track to provide hills and gullies in the roadway. The track 20" may be merely draped over the shape defining base blocks 21 and retained in place by friction or held thereagainst by means of small fasteners. Holes 20"H are shown extending through the border portions 20"D of the trackway through which screws or tacks may be inserted to retain the trackway against the support member 21. If the support member 21 is molded of plastic, it may have a plurality of pin-like formations 21P molded integral in its upper surface 21' and extending outward therefrom to engage in the holes 20"H and retain the trackway against 21 as shown. The member 21 may also be shaped with a cavity indentation in its upper surface 21' substantially the width of the trackway 20" adapted to retain said trackway in position thereagainst either by frictional engagement of the side edging of the trackway and the side walls of the cavity or by prevention of lateral shifting of the trackway when laid thereon. Other longitudinal formations molded integral with the bottom of track 20" and the upper surface of member 21 may be employed to retain the two together.

In modified forms of the trackway shown in FIG. 9', said roadway formation may be shaped in curved as well as straight sections, in a closed loop formation to define a closed loop roadway or in any suitable configuration underneath which one or more of the supports or bridge-like members 21 may be placed to define the vertical shape of the track. Conventional shaping at the ends of the trackway sections may be employed to secure said sections to each other.

In FIG. 9" is shown a modified form of the construction of the trackway of FIG. 9' wherein one or more of the rails or wheel guiding runner portions 24" of the trackway 20" are provided with a cylindrical core member in the form of a bendable wire 24W which extends the length of the rail or runner and may be made of soft aluminum, copper or lead. Thus if the track is bent or flexed in a vertical direction, twisted or otherwise deformed, its shape will be determined at least in part by the degree the core member or members 24W are bent.

In FIG. 9a is shown another modified form of the invention wherein a flexible plastic base 20' which may comprise a toy track or rail of the type described and has one or more rail portions 20'R protruding upwardly from the base for guiding the wheel 28' of a toy vehicle riding thereon. Partially embedded within the rail portion 20'R and the base portion 20' is an extruded metal strip 25R shown as having a T-shaped cross section with the head of the T-section extending parallel to the bottom surface of the base portion 20' and serving to anchor the strip in position. The T-section 25R has the upper end of the T or the edge thereof protruding beyond the upper surface of the rail portion 20'R so as to permit the surface of the wheel 28' which is outwardly of the wheel flange 28'a, to ride thereon. If connected to a proper source of electrical energy, the T-strip 25R may thus serve a dual function. If made of bendable metal, it may be used to retain the shape of the track as bent. It may also serve as means for conducting electrical power to the vehicle through the wheels thereof and a pair of said strips located in respective rails may be provided in parallel electrical circuit with a power supply to power the vehicle motor and other devices thereof as the vehicle travels the trackway 20'. The strip 25R may have other cross sectional shapes including that of a flat strip, square, diamond or round wire which may be embedded as illustrated or crimp fastened to the rail portion 20'R on the outside surface thereof. Said conductor may also be embedded in a slotted channel in the base 20' to be slidably engaged by a brush and guide strip extending from the vehicle.

In another form of the invention, a side supported track 44 of the type illustrated in FIG. 5 may be suspended or supported above a playing surface and adapted to support a carriage or vehicle having one or more wheels riding in the upper channel 45 thereof and adapted to hang downwardly from said track which may serve as an overhead monorail support for the vehicle. By providing one or more wires 47' and 47" of bendable metal embedded in flexible plastic base, the overhead suspended monorail may be bent to conform to any desired configuration and supported by a plurality of uprights containing suspension pins 39 which are pluggable into holes in the side of the track as described.

A latitude of modification and substitution is intended in the foregoing disclosure and in certain instances some features of the invention will be used without a corresponding use of other features. Accordingly, it is appropriate that the appended claims be construed broadly and in a manner consistent with the spirit and scope of the invention.

What is claimed is:

[1. A trackway toy comprising in combination with a toy vehicle having plural wheels, a trackway including a base having an upper surface along which said vehicle may travel, guide means for defining a path of travel for said vehicle on said upper surface, said guide means including at least one formation molded integrally with said upper surface of said trackway and providing plural parallel extending surfaces against which respective wheels of said vehicle may ride to define said path of travel therealong, said base and said guide means being integrally molded of flexible plastic material and having the characteristic such that said base is normally incapable of self-support whereby said trackway will easily conform to non-planar surfaces and rigid support means for said trackway disposed adjacent said base and engaging a surface thereof in a manner to predetermine the shape the base, said guide means include a pair of spaced apart runner portions for defining the pathway of a vehicle moving over said track, and including border portions extending laterally outwardly from the respective runner portions, and each of said border portions having a series of apertures formed therein for receiving fasteners by which said trackway may be fixedly secured to a support block.]

[2. A trackway toy comprising in combination with a toy vehicle having plural wheels, a trackway including a base having an upper surface along which said vehicle may travel, guide means for defining a path of travel for said vehicle on said upper surface, said guide means including at least one formation molded integrally with said upper surface of said trackway and providing plural parallel extending surfaces against which respective wheels of said vehicle may ride to define said path of travel therealong, said base and said guide means being integrally molded of flexible plastic material and having the characteristic such that said base is normally incapable of self-support whereby said trackway will easily conform to non-planar surfaces and rigid support means for said trackway disposed adjacent said base and engaging a surface thereof in a manner to predetermine the shape of the base, said guide means include a pair of spaced apart runner portions for defining the pathway of a vehicle moving over said track, and including a bendable core imbedded in the runner portion of said trackway, said core extending the length of said runner portion whereby said bendable core determines to some extent the shape of said trackway.]

3. A trackway comprising in combination with a toy vehicle having plural wheels, a trackway including a base having an upper surface along which said vehicle may travel, guide means for defining a path of travel for said vehicle on said upper surface, said guide means including at least one formation molded integrally with said upper surface of said trackway and providing plural parallel extending surfaces against which respective wheels of said vehicle may ride to define said path of travel therealong, said base and said guide means being integrally molded of flexible plastic material and having the characteristic such that said base is normally incapable of self-support whereby said trackway will easily conform to non-planar surfaces and rigid support means for said trackway disposed adjacent said base and engaging a surface thereof in a manner to predetermine the shape of the base, said guide means include a pair of spaced apart runner portions for defining the pathway of a vehicle moving over said track, said spaced apart runner portions include upwardly extending rails for guiding the wheels of a vehicle.

[4. The invention as defined in claim 3 and including a metallic rail strip partially imbedded in said rail, the end of said rail strip projecting beyond the upper end of said rails to engage the surface of a wheel of a toy vehicle riding thereon.]

[5. The invention as defined in claim 4 wherein said rail strip is formed of an electric conducting metal.]

6. A trackway toy comprising in combination with a toy vehicle having plural wheels, a trackway including a base having an upper surface along which said vehicle may travel, guide means for defining a path of travel for said vehicle on said upper surface, said guide means molded integral with said upper surface of said trackway and providing surface means against which respective wheels of said vehicle may ride to define said path in travel therealong, said base and said guide means being integrally molded of flexible plastic material and having the characteristic such that said base is normally incapable of self-support whereby said trackway will easily conform to non-planar surfaces and rigid upright support means for suspendingly supporting said trackway therefrom in a manner to predetermine the shape of the base, said rigid upright supports comprising a plurality of spaced apart rigid uprights for supporting said track in suspension between said rigid uprights.

*7. A trackway toy in accordance with claim 3 wherein said spaced apart runner portions extend the length of said trackway along the lateral borders of the trackway.*

*8. A trackway toy in accordance with claim 3 wherein said rigid support means supports said trackway in a manner to cause curved deflection of said trackway and to impart an arcuate shape thereto.*

*9. A trackway-toy in accordance with claim 8 wherein said curved deflection of said trackway is effected by the weight of said trackway.*

*10. A trackway toy in accordance with claim 3 wherein said base has a central portion of flat sheet-like configuration and said spaced-apart runner portions extend upwardly from the upper surface of said flat sheet-like central portion and parallel to each other.*

*11. A trackway toy in accordance with claim 10 wherein said spaced apart runner portions extend the length of said trackway along the lateral borders of the trackway.*

*12. A trackway toy in accordance with claim 3 including fastening means securing said trackway to said rigid support means.*

*13. A trackway toy in accordance with claim 12 wherein said fastening means secures said trackway to said rigid support means at a location such that said trackway becomes arcuately curved in deflection downwardly from said rigid support means, under its own weight.*

*14. A trackway toy in accordance with claim 3 wherein said trackway is formed of thermoplastic resinous polymer selected from the group consisting of polyethylene, polyvinyl chloride and acetate resin.*

*15. A trackway toy in accordance with claim 3 wherein said trackway if formed of an extrusion of a plastic resin of substantially constant cross section and selected from the group consisting of polyethylene, polyvinyl chloride and acetate resin and wherein said extrusion is so configured as to permit said trackway to arcuately deform downwardly under its own weight when supported by said rigid support means.*

*16. A trackway toy in accordance with claim 3 wherein said trackway is configured and formed of a plastic material imparting such characteristics thereto that the trackway may be twisted laterally with respect to its longitudinal axis.*

*17. A trackway toy in accordance with claim 16 wherein said trackway is supported by and attached to said rigid support means in a manner to impart a lateral twist thereto to permit a vehicle travelling along said trackway to bank in its travel along said trackway.*

*18. A trackway toy in accordance with claim 3 wherein the wheels of said vehicle are adapted to ride inwardly of said upwardly extending rails defining said spaced apart runner portions of said guide means for said vehicle.*

* * * * *